US010496585B2

(12) United States Patent
Suzuki et al.

(10) Patent No.: US 10,496,585 B2
(45) Date of Patent: Dec. 3, 2019

(54) ACCELERATOR CONTROL APPARATUS, ACCELERATOR CONTROL METHOD, AND STORAGE MEDIUM

(71) Applicant: NEC CORPORATION, Tokyo (JP)

(72) Inventors: Jun Suzuki, Tokyo (JP); Masaki Kan, Tokyo (JP); Yuki Hayashi, Tokyo (JP); Takuya Araki, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/737,883

(22) PCT Filed: Jun. 20, 2016

(86) PCT No.: PCT/JP2016/002959
§ 371 (c)(1),
(2) Date: Dec. 19, 2017

(87) PCT Pub. No.: WO2016/208178
PCT Pub. Date: Dec. 29, 2016

(65) Prior Publication Data
US 2018/0300280 A1  Oct. 18, 2018

(30) Foreign Application Priority Data

Jun. 25, 2015  (JP) ................ 2015-127936

(51) Int. Cl.
*G06F 13/42*  (2006.01)
*G06F 16/27*  (2019.01)
(Continued)

(52) U.S. Cl.
CPC .............. *G06F 13/42* (2013.01); *G06F 9/50* (2013.01); *G06F 9/5016* (2013.01); *G06F 9/52* (2013.01); *G06F 16/27* (2019.01); *G06F 16/9024* (2019.01)

(58) Field of Classification Search
CPC ............ G06F 15/16; G06F 17/50; G09G 5/36
See application file for complete search history.

(56) References Cited

U.S. PATENT DOCUMENTS

| 5,764,993 A | 6/1998 | Shindo | |
|---|---|---|---|
| 2004/0039940 A1* | 2/2004 | Cox | ............... H04L 29/06 709/224 |

(Continued)

FOREIGN PATENT DOCUMENTS

| JP | 3-103980 A | 4/1991 |
|---|---|---|
| JP | 8-255143 A | 10/1996 |

(Continued)

OTHER PUBLICATIONS

International Search Report for PCT/JP2016/002959 dated Sep. 20, 2016 [PCT/ISA/210].

(Continued)

*Primary Examiner* — Getente A Yimer
(74) *Attorney, Agent, or Firm* — Sughrue Mion, PLLC

(57) ABSTRACT

Provided is an accelerator control apparatus including: an accelerator that is configured to store at least one segment data item of a plurality of segment data items obtained by dividing data, and a boundary data item that is data item being included in a segment data item adjacent to the at least one segment data item; and data management unit to determine whether a width of data which is included in the boundary data item and is consistent with the segment data item adjacent to the at least one segment data item, is equal to or larger than a reference width representing a width of data referred to in processing executed by the accelerator.

9 Claims, 14 Drawing Sheets

(51) Int. Cl.
*G06F 16/901* (2019.01)
*G06F 9/50* (2006.01)
*G06F 9/52* (2006.01)

(56) References Cited

U.S. PATENT DOCUMENTS

| | | | |
|---|---|---|---|
| 2005/0076322 A1* | 4/2005 | Ye | G03F 7/705 |
| | | | 716/52 |
| 2006/0147123 A1 | 7/2006 | Kajihata | |
| 2007/0192509 A1* | 8/2007 | Ohtsuka | H04N 1/32117 |
| | | | 709/246 |
| 2008/0112650 A1 | 5/2008 | Itou et al. | |
| 2015/0302283 A1* | 10/2015 | Sugimoto | H04N 1/32561 |
| | | | 358/1.18 |
| 2016/0300687 A1* | 10/2016 | Gomi | H01J 37/1472 |

FOREIGN PATENT DOCUMENTS

| | | |
|---|---|---|
| JP | 2006-174138 A | 6/2006 |
| JP | 2008-124742 A | 5/2008 |

OTHER PUBLICATIONS

Written Opinion for PCT/JP2016/002959 dated Sep. 20, 2016 [PCT/ISA/237].

\* cited by examiner

REFERENCE WIDTH
A=1

3×3 FILTER

EFERENCE WIDTH
A=2

5×5 FILTER

Fig. 7

MEMORY MANAGEMENT TABLE 36

| ACCELERATOR NUMBER | PAGE NUMBER | IN-USE FLAG | DATA NUMBER | DIVISION NUMBER |
|---|---|---|---|---|
| 51 | 1 | 1 | 61 | 1 |
| 51 | 2 | 1 | 61 | 3 |
| 51 | 3 | 1 | 62 | 1 |
| 51 | 4 | 1 | 62 | 3 |
| 51 | 5 | 0 | - | - |
| ... | ... | ... | ... | ... |
| 52 | 1 | 1 | 61 | 2 |
| 52 | 2 | 1 | 61 | 4 |
| 52 | 3 | 1 | 62 | 2 |
| 52 | 4 | 1 | 62 | 4 |
| 52 | 5 | 0 | - | - |
| ... | ... | ... | ... | ... |

Fig. 8

DATA MANAGEMENT TABLE 35

| DATA NUMBER | DIVISION NUMBER | CALCULATION COMPLETION FLAG | ACCELERATOR NUMBER | PAGE NUMBER |
|---|---|---|---|---|
| 61 | 1 | 1 | 51 | 1 |
| 61 | 2 | 1 | 52 | 1 |
| 61 | 3 | 1 | 51 | 2 |
| 61 | 4 | 1 | 52 | 2 |
| 62 | 1 | 1 | 51 | 1 |
| 62 | 2 | 1 | 52 | 1 |
| 62 | 3 | 1 | 51 | 2 |
| 62 | 4 | 1 | 52 | 2 |
| 63 | 1 | 0 | : | : |
| 63 | 2 | 0 | : | : |
| 63 | 3 | 0 | : | : |
| 63 | 4 | 0 | : | : |
| ... | ... | ... | ... | ... |

Fig. 9

EFFECTIVE WIDTH MANAGEMENT TABLE 34

| DATA NUMBER | DIVISION NUMBER | BOUNDARY WIDTH | EFFECTIVE WIDTH |
|---|---|---|---|
| 61 | 1 | 5 | 5 |
| 61 | 2 | 5 | 5 |
| 61 | 3 | 5 | 5 |
| 62 | 1 | 5 | 4 |
| 62 | 2 | 5 | 4 |
| 63 | 1 | : | ... |
| ... | ... | ... | ... |

ACCELERATOR CONTROL APPARATUS, ACCELERATOR CONTROL METHOD, AND STORAGE MEDIUM

CROSS REFERENCE TO RELATED APPLICATIONS

This application is a National Stage of International Application No. PCT/JP2016/002959 filed Jun. 20, 2016, claiming priority based on Japanese Patent Application No. 2015-127936 filed Jun. 25, 2015, the contents of all of which are incorporated herein by reference in their entirety.

TECHNICAL FIELD

The present invention relates to an accelerator control apparatus, an accelerator control method, and a program, and in particular, to an accelerator control apparatus, an accelerator control method, and a program that control calculation using an accelerator.

BACKGROUND ART

One example of an accelerator control apparatus is described in PTL 1. As illustrated in FIG. 14, the accelerator control apparatus described in PTL 1 includes one master computer 10 and a plurality of slave computers 111 to 113. The master computer 10 includes a data dividing unit 1001 and an overlapping part selection unit 1002. The data dividing unit 1001 divides graphic data in such a way that a graphic data amount included in each divided range is equal. The overlapping part selection unit 1002 selects an overlapping part of processing results received from the respective slave computers 111 to 113 and obtains a total processing result without any overlap. The slave computer 111 includes a graphic processing unit 1111 that processes a divided range. The other slave computers 112 and 113 each also include the same configuration as the slave computer 111.

The accelerator control apparatus of PTL 1 including the configuration operates as follows. The data dividing unit 1001 divides graphic data in such a way as an equal graphic data amount to be included in each divided range. The master computer 10 transmits respective share ranges obtained by combining a divided range and a boundary periphery range of the divided range to the individual slave computers 111 to 113. Graphic processing units 1111 to 1113 of the slave computers 111 to 113 process graphic data received from the master computer 10 independently with each other. The slave computers 111 to 113 transmit the processing results to the mater computer 10. The overlapping part selection unit 1002 makes selection on an overlapping part of the processing results received from the slave computers 111 to 113 and obtains a total processing result without any overlap.

CITATION LIST

Patent Literature

[PTL 1] Japanese Laid-open Patent Publication No. H3-103980

SUMMARY OF INVENTION

Technical Problem

It should be noted that the entire disclosed contents of PTL 1 described above are incorporated and described in the present description by reference. The following analysis has been conducted by the present inventors.

According to the accelerator control apparatus described in PTL 1, when data are divided and processed by using a plurality of accelerators (in PTL 1, equivalent to the slave computers 111 to 113), there is a problem that, a processing speed is decreased when any process is continuously executed for one piece of data in any order. The reason is that it is necessary to return divided data to a control unit (in PTL 1, equivalent to the master computer 10) every time each process is completed, and therefore a cost for data transfer is large.

Therefore, an improvement of processing speed becomes an issue when data are divided and processed by using a plurality of accelerators. An object of the present invention is to provide an accelerator control apparatus, an accelerator control method, and a program that contribute to a solution of the problem.

Solution to Problem

An accelerator control apparatus according to the first aspect of the present invention includes: an accelerator that is configured to store at least one segment data item of a plurality of segment data items obtained by dividing data, and a boundary data item that is data item being included in a segment data item adjacent to the at least one segment data item; and data management means for determining whether a width of data which is included in the boundary data item and is consistent with the segment data item adjacent to the at least one segment data item, is equal to or larger than a reference width representing a width of data referred to in processing executed by the accelerator.

An accelerator control apparatus according to the second aspect of the present invention includes: an accelerator that is configured to store at least one segment data item of a plurality of segment data items obtained by dividing data and a boundary data item that is data included in segment data item adjacent to the at least one segment data item; and data management means for causing the accelerator to store, as the boundary data item, data having a width larger than a reference width representing a width of data referred to in processing executed by the accelerator.

An accelerator control method according to the third aspect of the present invention includes: steps for storing, on an accelerator, at least one segment data item of a plurality of segment data items obtained by dividing data and a boundary data item that is data included in segment data item adjacent to the at least one segment data item; and steps for determining whether a width of data which is included in the boundary data item and is consistent with the segment data adjacent to the at least one segment data item, is equal to or larger than a reference width representing a width of data referred to in processing executed by the accelerator.

A program according to the fourth aspect of the present invention causes a computer to execute: processing of causing an accelerator to store at least one segment data item of a plurality of segment data items obtained by dividing data and a boundary data item that is data being included in segment data adjacent to the at least one segment data item; and processing of determining whether a width of data which is included in the boundary data item and is consistent with the segment data adjacent to the at least one segment data item, is equal to or larger than a reference width representing a width of data referred to in processing executed by the accelerator. The program may be provided as a program product that is stored in non-transitory computer-readable storage medium.

Advantageous Effects of Invention

According to the accelerator control apparatus, the accelerator control method, and the program according to the present invention, when data are divided and processed by using a plurality of accelerators, processing can be accelerated.

BRIEF DESCRIPTION OF DRAWINGS

FIG. 7 is a diagram exemplarily illustrating information stored by a memory management table of the accelerator control apparatus according to the first example embodiment of the present invention.

FIG. 8 is a diagram exemplarily illustrating information stored by a data management table of the accelerator control apparatus according to the first example embodiment of the present invention.

FIG. 9 is a diagram exemplarily illustrating information stored by an effective width management table of the accelerator control apparatus according to the first example embodiment of the present invention.

DESCRIPTION OF EMBODIMENTS

First, an outline of one example embodiment will be described. Drawing reference signs supplementarily appended to this outline are merely illustrative to assist understanding and are not intended to limit the present invention to an illustrated aspect.

Figure 1:
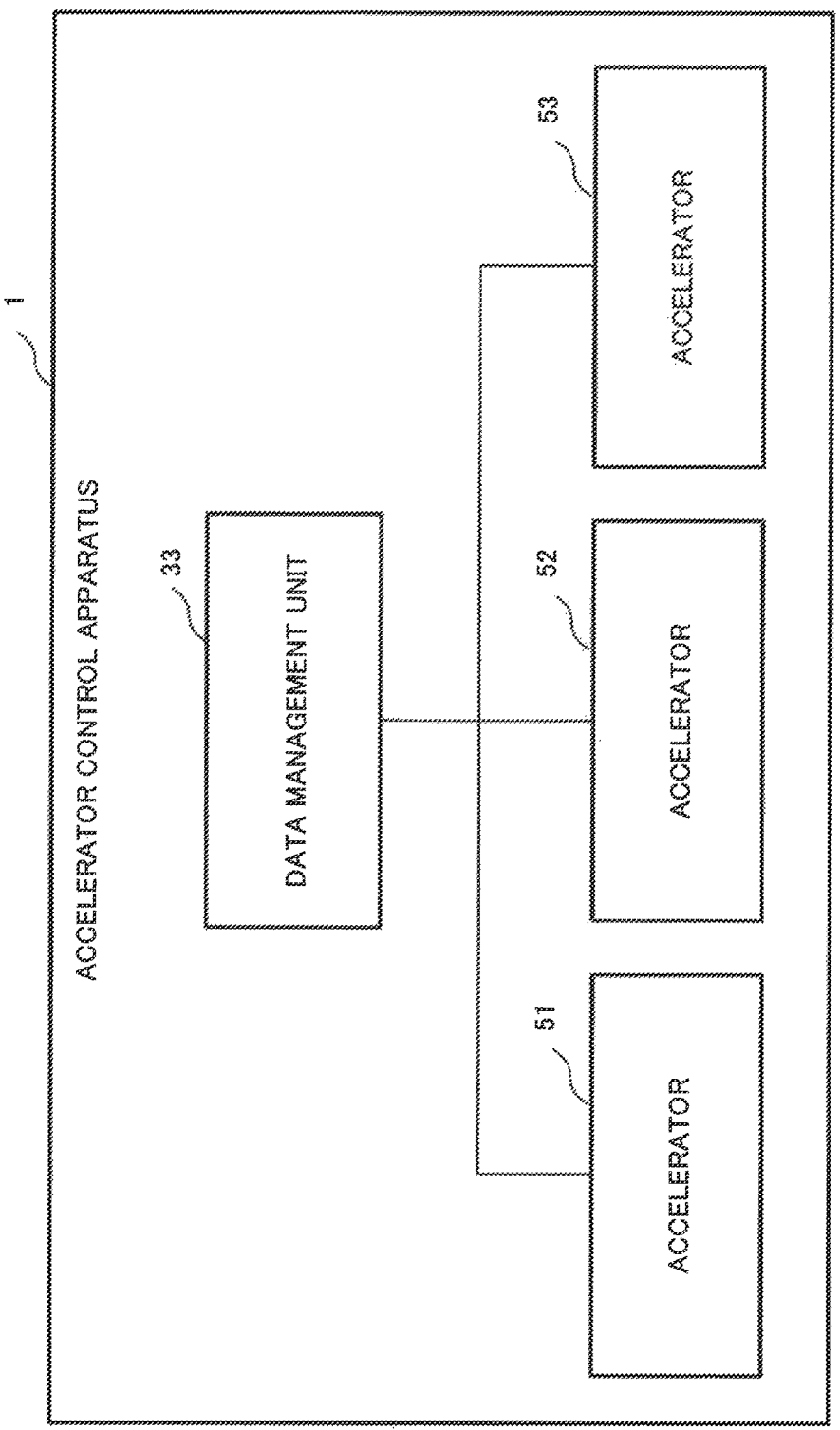
FIG. 1 is a block diagram exemplarily illustrating a configuration of an accelerator control apparatus according to one example embodiment of the present invention.

FIG. 1 is a block diagram exemplarily illustrating a configuration of an accelerator control apparatus 1 according to one example embodiment. Referring to FIG. 1, the accelerator control apparatus 1 includes an accelerator (for example, an accelerator 51) that stores at least one segment data item (for example, segment data of a top stage of FIG. 10) of a plurality of segment data items obtained by dividing data, and a boundary data item (for example, a boundary data item 92 of FIG. 10) that is data included in a segment data (for example, segment data of a middle stage of FIG. 10) adjacent to the at least one segment data item (the segment data of the top stage). The accelerator control apparatus 1 also includes a data management unit 33 that determines whether a width of data being included in the boundary data item (92) and being consistent with (having consistency with or having conformity with) the segment data item (the segment data item of the middle stage of FIG. 10) adjacent to the at least one segment data item, is equal to or larger than a reference width representing a width of data referred to in processing executed by the accelerator (51).

When determining that the width of the data being consistent is smaller than the reference width, the data management unit 33 synchronizes the boundary data item (92) and the segment data (the segment data of the middle stage of FIG. 10) adjacent to the at least one segment data item, before the data management unit 33 causes the accelerator (51) to execute processing.

According to the accelerator control apparatus 1, when data are divided and processed by using a plurality of accelerators, processing can be accelerated. The reason is that whether to execute data synchronization between the boundary data item and the adjacent segment data, is determined by resolving whether a width (effective width) of data being included in a boundary data item and being consistent with adjacent segment data is equal to or larger than a reference width. Thereby, also, when the effective width is equal to or larger than the reference width, an individual accelerator can continuously execute processing for data assigned to itself without synchronizing data among the accelerators.

According to another variation, the accelerator control apparatus 1 includes an accelerator (for example, an accelerator 51) that stores at least one segment data item (for example, segment data of a top stage of FIG. 10) of a plurality of segment data items obtained by dividing data and a boundary data item (for example, boundary data item 92 of FIG. 10) that is data included in segment data item (for example, segment data item of a middle stage of FIG. 10) adjacent to the at least one segment data item (the segment data of the top stage). Further, the accelerator control apparatus 1 includes a data management unit 33 that causes the accelerator (51) to store, as the boundary data item (92), data having of which width is larger than a reference width that represents a width of data referred to in processing executed by the accelerator (51).

According to the accelerator control apparatus 1, when data are divided and processed by using a plurality of accelerators, processing can be accelerated. The reason is that an accelerator is caused to store a boundary data item having a width (boundary width) larger than a reference width referred to in processing executed by the accelerator, and thereby it is unnecessary to synchronize, at every time of processing executed by the accelerator, data among the accelerators.

Figure 2:
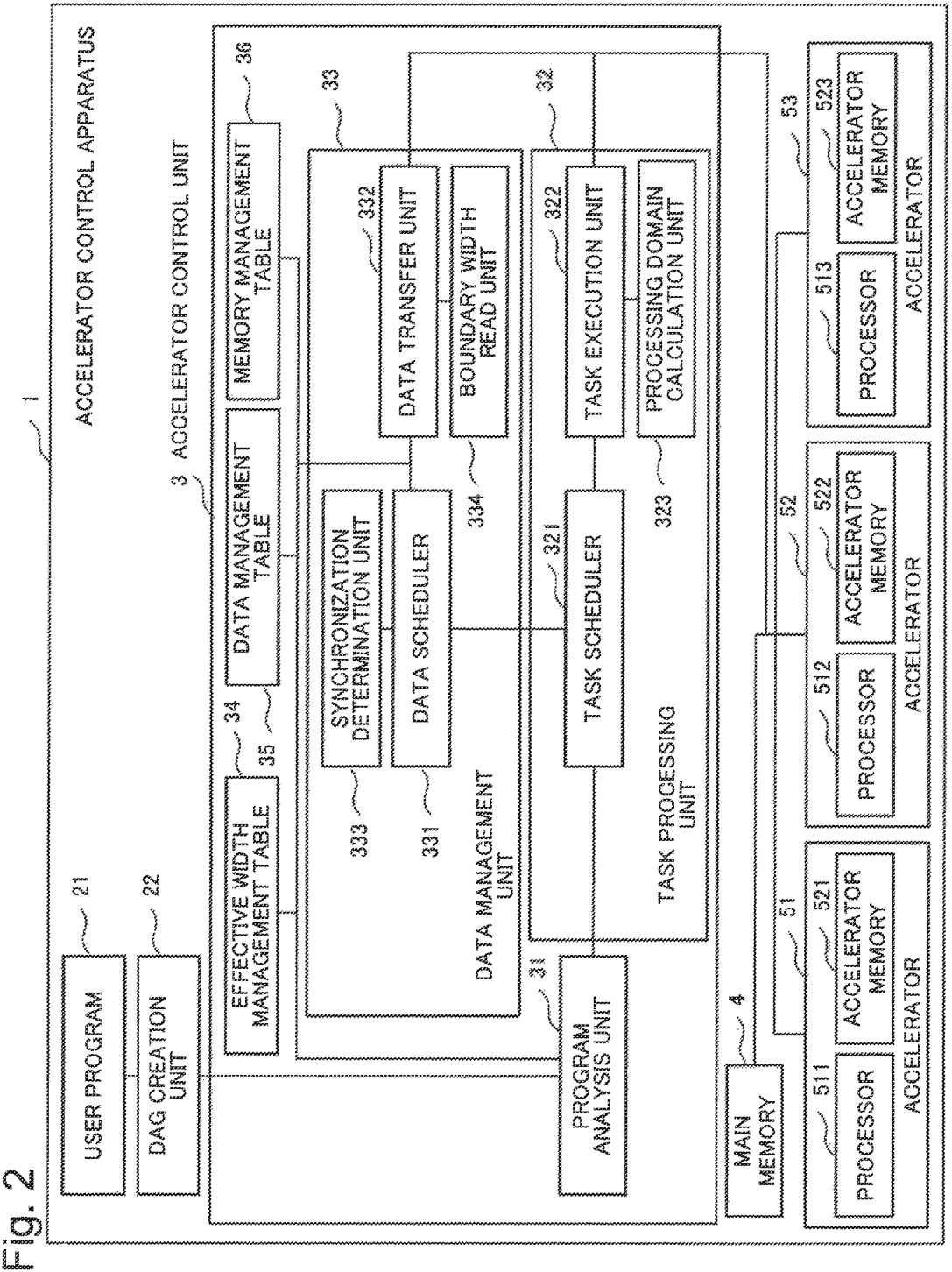
FIG. 2 is a block diagram exemplarily illustrating a configuration of an accelerator control apparatus according to a first example embodiment of the present invention.

With reference to FIG. 2, the accelerator control apparatus 1 according to yet another variation will be described. The accelerator control apparatus 1 includes a means (an effective width management table 34 of FIG. 2 and FIG. 9) for redundantly storing a boundary data item (92) regarding pieces of processed data (pieces of divided data 911 to 913 of FIG. 10) including a segment data item obtained by dividing data, and managing, as an effective width (94), a range having consistency with segment data item of the divided data (912) adjacent to the redundantly stored boundary data item (for example, the boundary data item 92 of the divided data 911). Further, the accelerator control apparatus 1 includes a means (a synchronization determination unit 333 of FIG. 2) for determining whether the effective width (94) of the divided data (911) is sufficient for a reference width indicating a reference range requested by a process provided from a user program 21. The accelerator control apparatus 1 executes, when the effective width (94) is equal to or larger than the reference width, the process of the user program 21 without synchronizing the boundary data item between the pieces of divided data (911, 912). On the other hand, the accelerator control apparatus 1 executes, when the effective width is insufficient, synchronization between the pieces of divided data (911, 912) and then executes the process of the user program 21.

Further, the accelerator control apparatus 1 includes an effective width management table (34) that manages, as an effective width (94), in a boundary data item (92) of divided data (911) redundantly held by data subjected to division, a range of data of the boundary data item (92) being consistent with (having consistency with or having conformity with) adjacent divided data (912) holding segment data. Further, the accelerator control apparatus 1 includes a synchronization determination unit (333) that determines whether a reference width referring to data that need processing executed for data subjected to division is equal to or smaller than the effective width (94) of the divided data (911) to be processed. Further, the accelerator control apparatus 1 includes a processing range calculation unit (323) that calculates, as a data range to be processed, a range obtained by subtracting the reference width from the effective width (94) of the divided data (911) and a segment data item of the divided data (911).

When the effective width (94) of the divided data (911) is equal to or larger than a reference width for processing, a process provided from the user program 21 is executed without synchronizing the boundary data item (92) between the pieces of divided data (911, 912). On the other hand, when the effective width (94) is smaller than the reference width for processing, the boundary data item is synchronized between the pieces of divided data (911, 912) and then a process provided from the user program 21 is executed. Further, it is assumed that a calculation target range at that time includes a segment data item of the divided data (911) and data of a width obtained by subtracting the reference width for processing from the effective width (94) of the boundary data item (92).

The accelerator control apparatus 1 employing the configuration redundantly stores a boundary data item (92) regarding pieces of divided data (911 to 913). And the accelerator control apparatus 1 executes processing without synchronizing the boundary data item among the pieces of divided data, when a reference width necessary to execute a series of processes provided from the user program 21 is determined to be satisfied with an effective width (94) of redundant data included in the boundary data item (92). The accelerator control apparatus 1 synchronizes the boundary data item (92), and then executes processing in a case where the effective width (94) is determined to be insufficient for the reference width. Thereby, without transferring data subjected to division among a plurality of accelerators (51 to 53), the accelerator control apparatus 1 continuously executes any process (for example, in any order).

According the accelerator control apparatus, when data are divided and processed by using a plurality of accelerators, any process can be continuously executed for one piece of data (for example, in any order) at high speed. The reason is that processing for pieces of divided data can be executed continuously while the pieces of divided data being stored on a plurality of accelerators, and a cost for synchronizing a boundary data item among the pieces of divided data in respective processes can be reduced.

First Example Embodiment

Next, an accelerator control apparatus according to a first example embodiment will be described in detail with reference to drawings.

FIG. 2 is a block diagram exemplarily illustrating a configuration of an accelerator control apparatus 1 according to the present example embodiment. Referring to FIG. 2, the accelerator control apparatus 1 includes an accelerator 51, an accelerator 52, and an accelerator 53 that execute calculation processing, a main memory 4 that saves data having been difficult to store by an accelerator due to a lack of memory resources, an accelerator control unit 3 that controls an accelerator, a user program 21, and a DAG creation unit 22. The DAG creation unit 22 creates a DAG (Directed Acyclic Graph) represents a process of the user program by use of an API (Application Programming Interface) call of the user program 21, and transmits the created DAG to the accelerator control unit 3.

The accelerator 51 includes a processor 511 that processes data and an accelerator memory 521 that stores the data. In the present example embodiment, it is assumed that a number of accelerators is three for description convenience, but the number of accelerators may be any number equal to or larger than one. The accelerator is typically a GPU (Graphics Processing Unit) of NVIDIA Corporation or an Xeon Phi of Intel Corporation. The accelerator is mounted by being inserted into an I/O (Input/Output) slot of a computer and functions as a co-processor of a CPU (Central processing Unit) of the computer. Hereinafter, when description overlaps with respect to a plurality of accelerators, description will be made for only the accelerator 51. The same description as the description for the accelerator 51 is applicable to the accelerators 52 and 53.

The user program 21 is, for example, an application program created by a programmer using an accelerator. The user program 21 is implemented by using a reservation API and an execution API of two types provided by the DAG creation unit 22 illustrated in FIG. 3.

Figure 3:
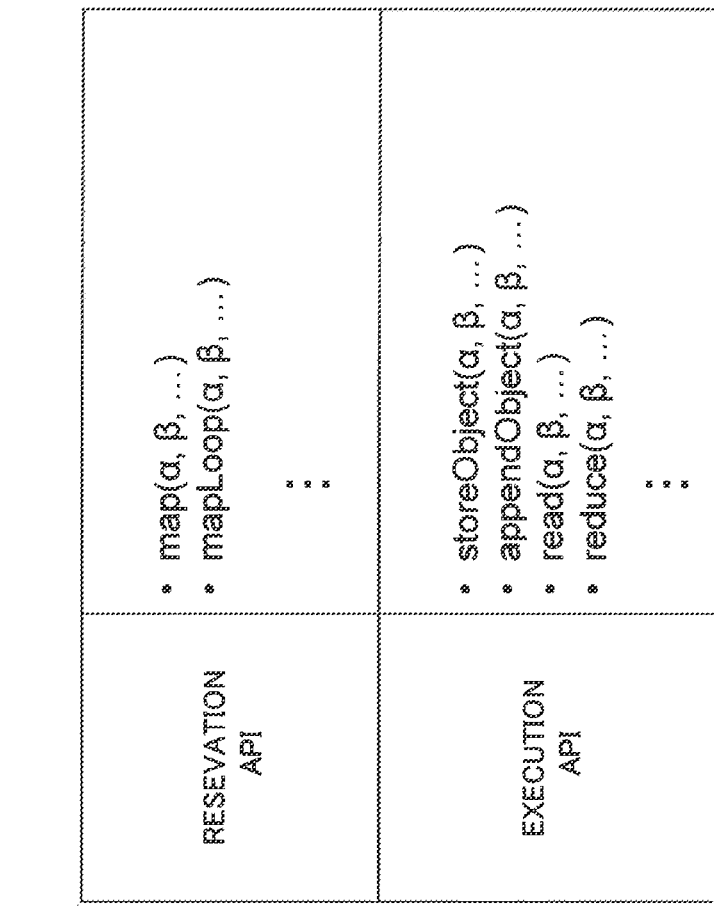
FIG. 3 is a diagram exemplarily illustrating an API provided by a DAG creation unit of the accelerator control apparatus according to the first example embodiment of the present invention.
Figure 4:
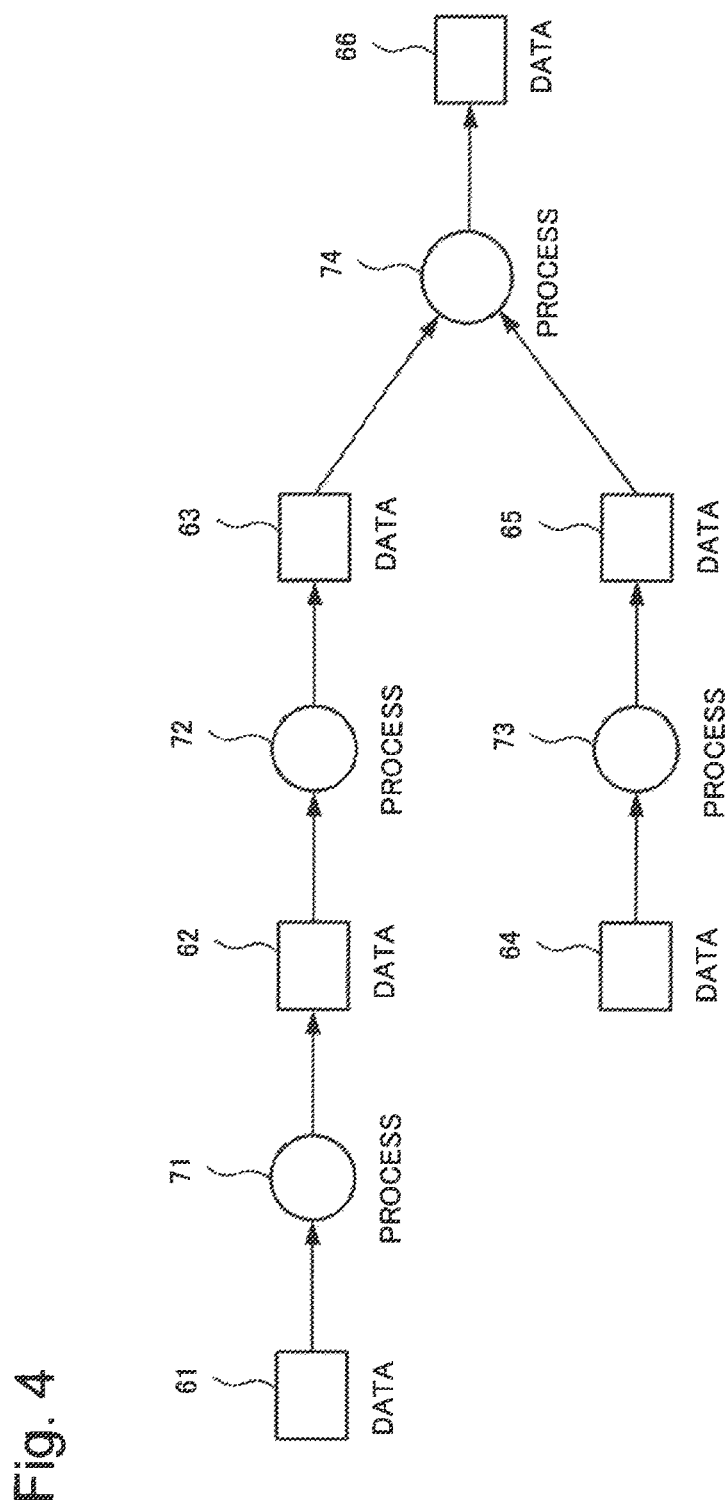
FIG. 4 is a diagram exemplarily illustrating a DAG provided by the DAG creation unit of the accelerator control apparatus according to the first example embodiment of the present invention.

The reservation API illustrated in FIG. 3 corresponds to one process of a DAG illustrated in FIG. 4. When a reservation API is called from the user program 21, the DAG creation unit 22 adds one process and data generated by the process to a DAG. When, for example, a process 71 is called for data 61 using the reservation API in FIG. 4, the DAG creation unit 22 adds the process 71 and data 62 being output data of the process 71 to the DAG.

The reservation API is an API for reserving a process. In other words, immediately after the reservation API is called, a DAG is created bu processing in an accelerator is not executed. On the other hand, when an execution API is called, there is a case where a new process and data generated by the process may be added to a DAG or a case where the new process and data generated by the process may not be added to a DAG, however execution of processing for the DAG generated up to this point is triggered. A process belonging to the execution API includes a process in which data obtained after processing a DAG in the user program 21 are needed, and a process in a case of a "storeObject" for storing data of a calculation result as a data object on a memory of an accelerator, and the like.

The reservation API and the execution API may have one or a plurality of arguments ($\alpha$, $\beta$, ... illustrated in FIG. 3). One of these arguments may be a function (referred to as a kernel function) representing a process executed for data by the user program 21. Whether the function is needed depends on types of the reservation API and the execution API. The reservation API and the execution API each indicate a pattern of processing executed for data, and specific processing is executed by a kernel function provided as an argument of the reservation API or the execution API in the user program 21.

One example pattern of a process is a "map" indicated in the reservation API of FIG. 3. In the "map", a kernel function is applied to all elements configuring input data. As an example of input data of a DAG, a table of an image and a database is conceivable. When the "map" is applied to these pieces of data, a kernel function is applied individually to each pixel of the image and each entry of the database.

On the other hand, examples of an API in which a kernel function is not needed include a "storeObject", an "appendObject", a r"ead" indicated in the execution API of FIG. 3, and the like. The "storeObject" stores a calculation result as a data object on a memory of an accelerator. In the "storeObject", data stored as a data object on a memory of an accelerator can be named. At that time, as an argument of an API of the "storeObject", the name of the object is transferred. Further, the "appendObject" is an API used when data are added to a tail of an already-existing object.
Further, the "read" acquires, in a user space, a content of a data object present on an accelerator.

Further, a data object stored on a memory by an accelerator can be specified as input data of a process indicated by a DAG. In this case, as input data of a process executed by the reservation API and the execution API, a name of an object stored by the accelerator is specified. As this name, a name provided by the user program 21 when calling a "storeObject" is used. Further, as another example of input data of a process indicated by a DAG, data stored on an outside of an accelerator such as a file system can be specified. In this case, as input data of a process executed by the reservation API and the execution API, a name of an object stored by the file system or the like is specified.

The reservation API stores a reference width "A" according to a type of an API. The reference width "A" is information referred to by a kernel function provided by the reservation API when executing calculation relating to an element (assigned data element) of data assigned for calculation and indicates a width of a data element adjacent to the assigned data element.

Figure 5A:
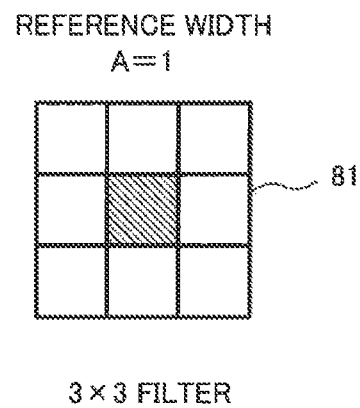
FIG. 5A is a diagram for illustrating a reference width in filter processing of image processing.
Figure 5B:
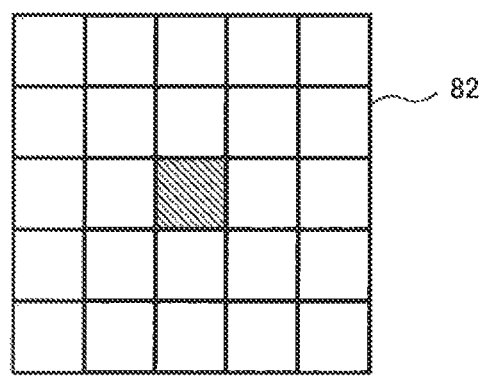
FIG. 5B is a diagram for illustrating a reference width in filter processing of image processing.

The reference width will be described using filter processing in image processing illustrated in FIG. 5A and FIG. 5B. FIG. 5A illustrates a "3×3" filter 81 in image processing, and FIG. 5B illustrates a "5×5" filter 82 in image processing.

In the "3×3" filter 81, in order to calculate a central pixel, eight pixels adjacent to the pixel are referred to. On the other hand, in the "5×5" filter 82, in order to calculate a central pixel, up to a pixel farther by one from the case of the "3×3" filter 81 is referred to and therefore 24 pixels are referred to. These pieces of filter processing are used when a pixel value is smoothed by calculating an average value of each pixel and a neighboring pixel, for example, in order to eliminate noise of an image. In the case of the "3×3" filter 81, up to a first neighboring pixel is referred to, and therefore a reference width "A" of the reservation API is "A=1". On the other hand, in the case of the "5×5" filter 82, a second neighboring pixel is referred to, and therefore a reference width "A" of the reservation API is "A=2". In the cases of FIG. 5A and FIG. 5B, reference widths are determined by widths of a vertical direction and a lateral direction. These reference widths are provided as a parameter A when a program for creating the user program 21 uses the reservation API.

Figure 6:
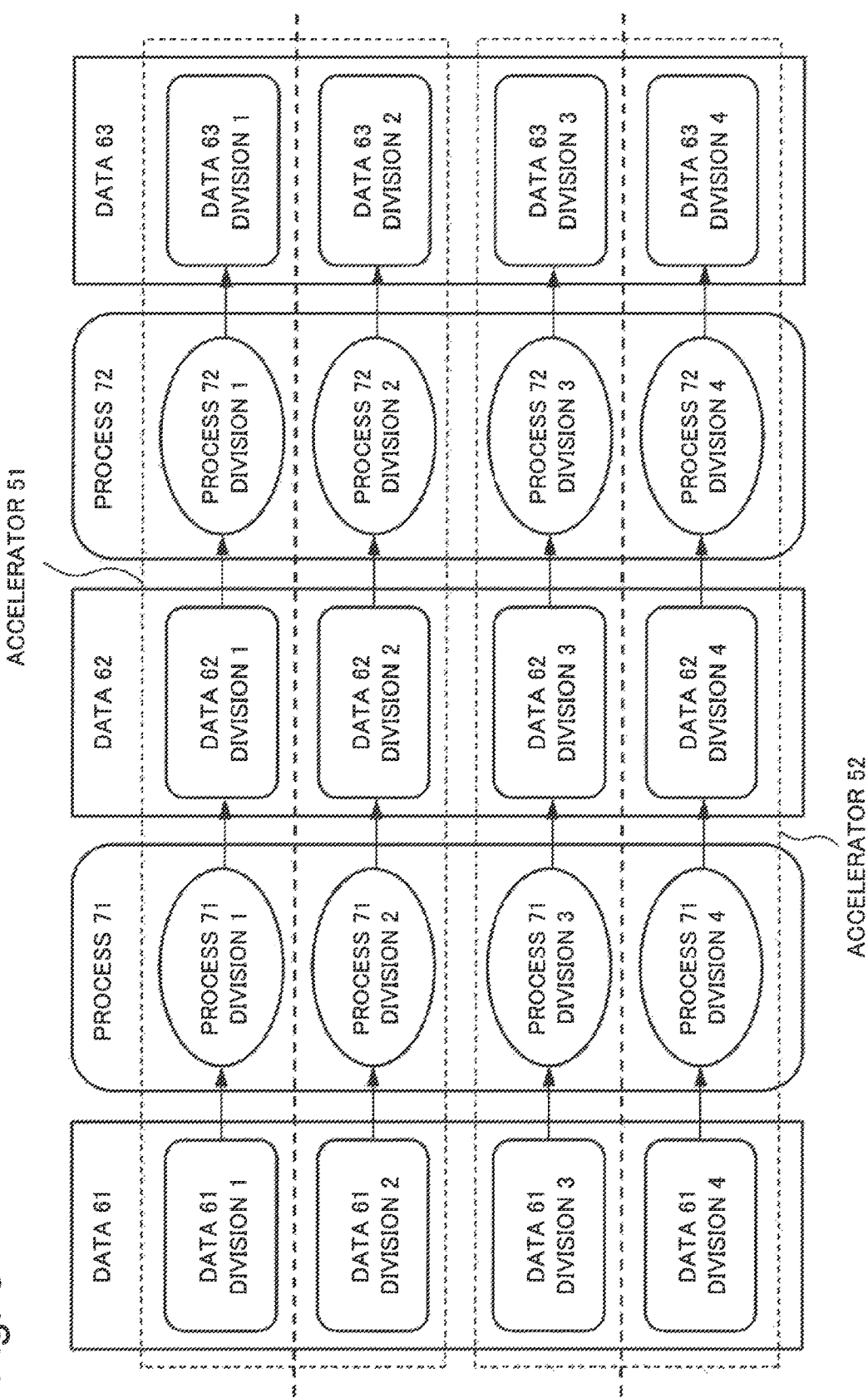
FIG. 6 is a diagram exemplarily illustrating division of data and a process included in a DAG.

The DAG of FIG. 4 will be further described. In the present example embodiment, a process of a DAG is executed by a plurality of accelerators in a distributed manner. Therefore, each piece of data of the DAG is divided into two or more pieces as illustrated in FIG. 6. FIG. 6 illustrates an example in which in data 61, a process 71, data 62, a process 72, and data 63 of the DAG of FIG. 4, each piece of data is divided into four pieces. In this case, for example, when the process 71 is applied to "data 61 division 1", "data 61 division 2", "data 61 division 3", and "data 61 division 4" totaling four combinations, the result same as a result obtained by executing processing without dividing the data 61 can be obtained. This processing belongs to a processing form known as data parallel in a field of parallel calculation and is a publicly known technique in the technical field of the present invention.

In FIG. 6, processing for the "data 61 division 1" is described as "process 71 division 1" and the like, but a processing content for each element configuring data is the same as in the process 71 in FIG. 4. Further, as one example, it is possible that processing for the "data 61 division 1" and the "data 61 division 2" may be executed by the accelerator 51 and processing for the "data 61 division 3" and the "data 61 division 4" may be executed by the accelerator 52. In an ideal case, calculation performance is twice as high as calculation performance in a case where all of the four pieces of divided data are processed by one accelerator. Further, a case where processing for the data 61 is executed by two accelerators in a distributed manner has been illustrated here, however, the processing can be executed by three or more accelerators. In this case, a unit of processing distributed to each accelerator corresponds to each division of data and a process.

The DAG creation unit 22 generates a DAG every time the user program 21 calls the reservation API and the execution API. When the reservation API is called, the DAG creation unit 22 adds a corresponding process and output data to a DAG. On the other hand, when the execution API is called, the DAG creation unit 22 adds a process and output data when the addition is necessary and notifies the accelerator control unit 3 of a DAG generated up to this point. The DAG created by the DAG creation unit 22 includes a type of the reservation API or the execution API called by the user program 21, a kernel function provided for each API, and a reference width.

Referring to FIG. 2, the accelerator control unit 3 includes a program analysis unit 31, a tack processing unit 32, a data management unit 33, a memory management table 36, a data management table 35, and an effective width management table 34. The program analysis unit 31 analyzes a DAG indicating a process of the user program 21 received from the DAG creation unit 22. The task processing unit 32 executes the process of the DAG. The data management unit 33 manages and prepares data necessary for the process of the DAG. The memory management table 36 is used to manage a memory of an accelerator. The data management table 35 is used to manage data on a memory of an accelerator. The effective width management table 34 is used to manage an effective width of a boundary data item of divided data in a memory of an accelerator.

The memory management table 36 is used as a table for managing a memory of an accelerator. The memory of the accelerator is managed, for example, by being divided into pages of a given size. The page size is, for example, 4 KB or 64 KB. The memory management table 36 stores information relating to each page as illustrated in FIG. 7. The information of each page stores an accelerator number to which the page belongs, a page number, an in-use flag indicating that the page is being used, used data (data number) indicating an identifier of data stored by the page when the page is being used, and a data division number indicating that the data stored by the page are a division of data. The in-use flag is a Boolean value. An identifier of data is assigned to each piece of data (data 61 or data 62 of FIG. 4) of a DAG. For example, a first entry of the memory management table 36 illustrated in FIG. 7 indicates that a page 1 of an accelerator number 51 is being used by a division 1 of a data number 61. In the following description, it is assumed that when being simply referred to as data, data included in a DAG indicated by the data 61 or the data 62 of FIG. 4 are indicated.

The data management table 35 is used to manage data on a memory of an accelerator. The data management table 35 stores information relating to data in a DAG transmitted from the user program 21 as illustrated in FIG. 8. Information of each piece of data stores a data number, a division number of each piece of data, a calculation completion flag indicating whether the data have been already calculated, an accelerator number indicating an accelerator number that stores the data, and a page number of the accelerator that stores the data. When divided data extend to a plurality of pages, a page number of a top page is set. The calculation completion flag is a Boolean value. For example, a first entry of the data management table 35 illustrated in FIG. 8 indicates that a division 1 of data having a data number of 61 has been already calculated and is stored on a page 1 of the accelerator 51.

Figure 10:
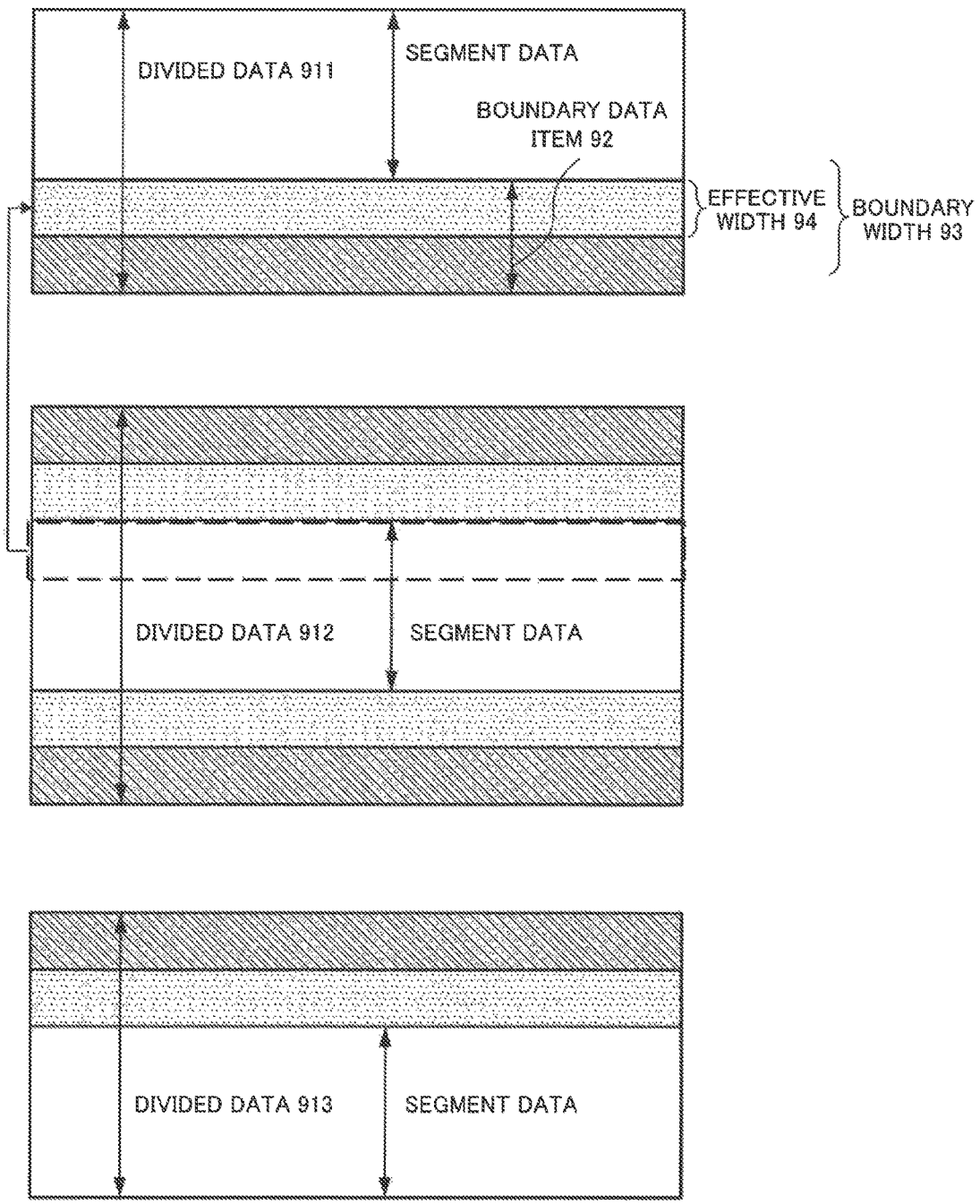
FIG. 10 is a diagram for illustrating a boundary width and an effective width in the accelerator control apparatus according to the first example embodiment of the present invention.

The effective width management table 34 stores information relating to a boundary width and an effective width for each division of each piece of data as illustrated in FIG. 9. Using FIG. 10, a boundary width and an effective width of each piece of data will be described below. FIG. 10 illustrates that one piece of data is divided into three parts and includes three pieces of divided data 911 to 913. A number of divisions of 3 is merely an example, and the present invention is not limited to the number of divisions. A case where data are an image and the image is divided into three parts in a lateral direction will be described below as an example. The data are not limited to an image to be described this time, and the present invention can be applied when data are configured as a set of any elements such as data of fluid simulation and log data.

Hereinafter, the divided data 911 will be described. The same description is applicable to the other pieces of divided data 912 and 913. The divided data 911 store an image range (hereinafter, referred to as a "segment data item") divided from original data, and a part of a range of the divided data 912, the part of range being in contact with the divided data 911. This part is described as a boundary data item 92. A width of the boundary data item in a direction of the divided data 912 is described as a boundary width 93. In the case of FIG. 10, for example, "the boundary width 93 is 10" means that a vertical pixel number of the boundary data item 92 is 10.

Further, a concept of an effective width 94 is introduced into the boundary width 93. The effective width 94 has a value of a range of which minimum value is equal to or larger than 0, and maximum value is a value of the boundary width 93. The effective width 94 is a width of data being included in the boundary data item 92 and keeping consistency with adjacent divided data 912 storing segment data. In other words, the effective width 94 represents a width of data included in the boundary data item 92 of the divided data 911 in which a content of the data is consistent with that of the divided data 912. Adversely, in the boundary data item 92, data of a range that is not included in the effective width 94 may not be consistent with the divided data 912.

The program analysis unit 31 analyzes a DAG indicating a process of a user received from the DAG creation unit 22 and divides the analyzed DAG into data and processes. The program analysis unit 31 creates an entry in the data management table 35 for data in the DAG. The program analysis unit 31 creates this entry for a data division number. At the time of entry creation of data, each piece of divided data has not been calculated yet, and therefore a calculation completion flag is 0. However, when data have been already stored on a memory of an accelerator such as a case where as input data of a DAG, data output by a previous DAG are used, it is not necessary for the program analysis unit 31 to create a new entry in the data management table 35, and a calculation completion flag has been set.

The program analysis unit 31 also creates an entry in the effective width management table 34. At the time of creating an entry, values of a boundary width and an effective width are indefinite. Also with regard to the effective width management table 34, in the same manner as in the case of the data management table 35, an entry exists for data created before processing of a DAG transferred from the user program 21. Therefore, it is not necessary for the program analysis unit 31 to create an entry for the data.

Further, the program analysis unit 31 divides a DAG into units of processes and requests the task processing unit 32 to execute each process. The process refers to, for example, a process 71, a process 72, or the like illustrated in FIG. 4. The program analysis unit 31 individually makes a request for process execution for each piece of divided data configuring input data of a process. Hereinafter, a process to be executed for each piece of divided data will be described by being referred to as a subtask. The subtask corresponds to, for example, "process 71 division 1", "process 71 division 2", or the like. Further, an execution request for a subtask includes information of a reference width necessary to execute the subtask. This value is a value specified from the user program 21 as an argument of the reservation API of FIG. 3.

Referring to FIG. 2, the data management unit 33 includes a data scheduler 331, a data transfer unit 332, a synchronization determination unit 333, and a boundary width read unit 334. The data scheduler 331 makes an instruction for managing data stored by a memory of an accelerator and allocating a memory. The data transfer unit 332 causes an accelerator to load data and allocates a memory. The synchronization determination unit 333 determines whether it is necessary to synchronize data between pieces of divided data. The boundary width read unit 334 reads a setting value of a boundary width of divided data from a setting file or the like and responds to an inquiry from the data transfer unit 332.

The synchronization determination unit 333 receives a request from the data scheduler 331, determines whether an effective width of specified divided data is equal to or larger than a reference width necessary for executing a specified subtask by referring to the effective width management table 34, and notifies the data scheduler 331 of a result of determination.

The data scheduler 331 manages the accelerator memory 521 of the accelerator 51 by referring to the memory management table 36. This is the same as for the other accelerators 52 and 53. The data scheduler 331 receives, from the task processing unit 32, a request for preparing input divided data necessary for executing a subtask and allocating a memory area for outputting output divided data. In the request, a reference width necessary for executing the subtask is included.

When a subtask to be executed is a first subtask of a DAG, an identifier of a data object stored in a memory of an accelerator has been specified as input divided data in a certain case. In this case, input data have been already prepared on the accelerator memory, and therefore it is not necessary for the data scheduler 331 to do anything. As another case, there is a case where input divided data specified by an identifier are data stored on an outside of an accelerator such as a file system and the input divided data needs to be loaded onto a memory in the accelerator. When loading onto the memory is necessary, the data scheduler 331 requests the data transfer unit 332 to load input divided data onto an accelerator. At that time, the accelerator for loading is specified.

When a subtask to be executed belongs to a process other than a first process included in a DAG, in a case where a subtask belonging to a previous process of the DAG is completed, input divided data of the subtask to be executed have been already output and a calculation completion flag of a corresponding entry of the data management table 35 has been also asserted. In this case, the input divided data are in a preparation completion state on a memory of a data accelerator, and therefore it is not necessary for the data scheduler 331 to do anything.

Further, the data scheduler 331 inquires of the synchronization determination unit 333 about input divided data, and confirms whether an effective width of the input divided data at that time is equal to or larger than a reference width of a subtask about to be executed. When the effective width is not equal to or larger than the reference width, the data scheduler 331 requests the data transfer unit 332 to synchronize boundary data item. On the other hand, when the effective width is equal to or larger than the reference width, synchronization is not necessary, and therefore the data scheduler 331 does not perform any operation.

Further, the data scheduler 331 requests, with respect to output divided data, the data transfer unit 332 to allocate a number of pages necessary for output divided data of a subtask requested by the task processing unit 32. In this case, an accelerator that allocates a page is the same as an accelerator that stores input divided data.

Further, the data scheduler 331 requests the data transfer unit 332 to lock a memory area of input divided data and output divided data. This lock indicates that the memory area of the input divided data and the output divided data are being used for calculation. Further, the data scheduler 331 receives a completion notification of a process from the task processing unit 32 and notifies the data transfer unit 332 to release a lock of a page being locked and set a calculation completion flag of the output divided data in the data management table 35. Depending on the type of process requested by the task scheduler 321 to be executed, either input divided data or an output memory area may be prepared. For example, in an execution request for a "read" for acquiring a content of a data object, it is not necessary to prepare an output memory area.

The data transfer unit 332 receives an instruction from the data scheduler 331, allocates a memory of an accelerator, and transfers data to the accelerator. The data transfer unit 332 receives an instruction from the data scheduler 331, allocates a memory of an accelerator, and registers an entry of a page of the memory allocated in the memory management table 36. The data transfer unit 332 also registers an accelerator number and a page number corresponding to the accelerator having allocated the memory in an entry of a division of data of the data management table 35. The data transfer unit 332 receives an instruction from the data scheduler 331 and sets an in-use flag (lock flag) of a page being used for calculation. In addition, the data transfer unit 332 releases an in-use flag (lock flag) of a calculation-completed page. The data transfer unit 332 sets a calculation completion flag of the data management table 35 of output divided data.

Further, the data transfer unit 332 receives an instruction from the data scheduler 331 and loads, onto a memory of an accelerator, a data portion corresponding to divided data from data stored on an outside of the accelerator such as a file system. In this case, the data transfer unit 332 inquires of the boundary width read unit 334 about a boundary width of a boundary data item to be added to the divided data and creates a boundary data item of the instructed width. Then, the data transfer unit 332 registers the created boundary width and an effective width of the divided data in the entry of the effective width management table 34. When data are loaded, the boundary width and the effective width have the same value.

Referring to FIG. 2, the task processing unit 32 includes a task scheduler 321, a task execution unit 322, and a processing range calculation unit 323. The task scheduler 321 requests the data management unit 33 for divided input data and a memory area of divided output data necessary for executing a subtask and requests the task execution unit 322 to execute the subtask. The task execution unit 322 causes an accelerator to execute the subtask requested from the task scheduler 321. The processing range calculation unit 323 calculates a data range where a subtask is executed for input divided data.

The task scheduler 321 receives an execution request for a process included in a DAG from the program analysis unit 31. The request is received in a unit of a subtask executed for divided data. The subtask includes a reference width necessary for executing the subtask itself. The reference width is transferred from the user program 21. The reference width necessary for executing a subtask is transmitted to the data scheduler 331 and the task execution unit 322, as necessary.

The task scheduler 321 executes, among requested subtasks, processing in order from a subtask belonging to an upstream process of a DAG. This means that a request for divided input data and a memory area for divided output data necessary for executing a subtask is made to the data management unit 33 in order from an upstream side of a DAG. For example, in the DAG illustrated in FIG. 4, the process 71 and the process 73 each are an upstream process. The task scheduler 321 completes execution of all the subtasks belonging to an upstream process and thereafter executes a subtask included in the following downstream process present on a downstream side. In this manner, execution of each process transits one by one.

The task scheduler 321 requests the data management unit 33 to prepare input divided data necessary for a subtask to be executed and allocate a memory area of output divided data. The task scheduler 321 receives a notification of completion of the preparation of the divided input data and the allocating of the memory area requested to the data management unit 33 and thereafter notifies the task execution unit 322 to execute a corresponding subtask. Further, the task scheduler 321 receives an execution completion notification of the subtask from the task execution unit 322 and notifies the data management unit 33 to release a lock of the input divided data and the memory of the output divided data in response to the completion of the process.

The task execution unit 322 receives an instruction from the task scheduler 321 and executes a subtask by using a kernel function indicating a specific process for the subtask of the user program 21 received from the task scheduler 321. The task execution unit 322 can determine information used for the subtask by referring to the data management table 35 with respect to information of an accelerator that executes the subtask, an input address, and an output address. However, these pieces of information may be notified to the task execution unit 322 from the task scheduler 321. Further, the task execution unit 322 inquires of the processing range calculation unit 323 about a range of the calculated input data for executing the subtask and executes processing for the instructed range.

The task execution unit 322 notifies the task scheduler 321 of execution completion of the subtask. Further, the task execution unit 322 registers a value obtained by subtracting a reference width of the subtask from a value of an effective width which is set in an entry of input divided data of the executed subtask, into an entry of output divided data of the effective width management table 34, as an effective width.

The processing range calculation unit 323 calculates a calculated range in input divided data executed by a subtask. The calculated range refers to a region where an original range of input divided data and a range obtained by subtracting a reference width "A" of a subtask to be executed this time from data corresponding to an effective width in a boundary data item of divided data are combined. Specific description is made below with reference to FIG. 10. When the effective width 94 of the divided data 911 is "4", in order to apply the "3×3" filter 81 of FIG. 5A to a certain pixel, it is necessary to use one adjacent pixel for reference (for example, a reference width "A"=1). Therefore, in execution of a subtask for applying the "3×3" filter 81 to the divided data 911, calculation is performed up to a range where a width of the boundary data item is "3", and one width remaining is used for reference.

Operation

Next, an operation of the present example embodiment will be described in detail by using drawings.

Figure 11:
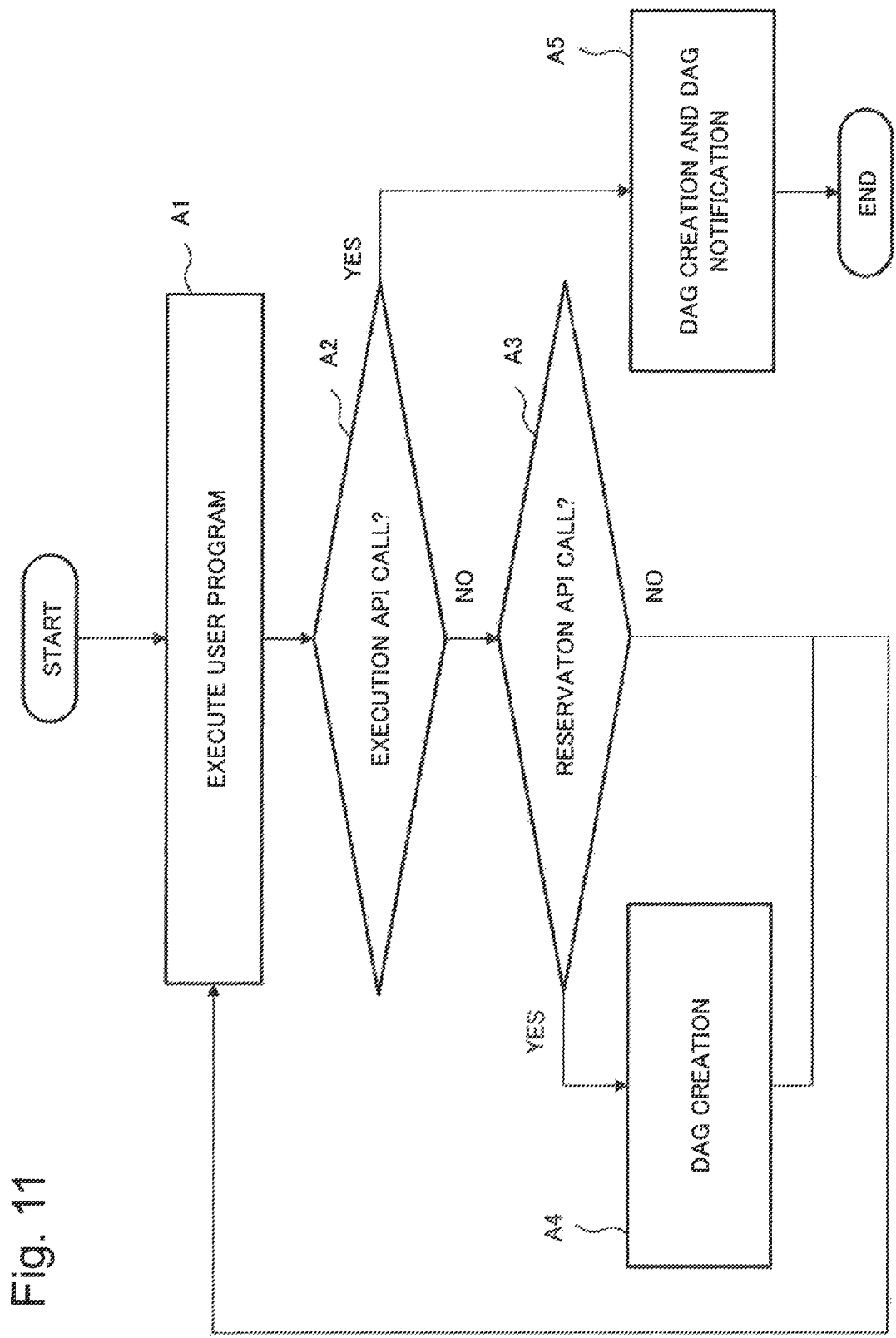
FIG. 11 is a flowchart exemplarily illustrating an operation of a DAG creation unit by the accelerator control apparatus according to the first example embodiment of the present invention.

First, by using FIG. 2 and FIG. 11, an operation for creating a DAG indicating a process of a user by a request of the user program 21 and requesting the accelerator control unit 3 to execute the DAG will be described. FIG. 11 is a flowchart exemplarily illustrating the operation.

First, a user program 21 created by using a reservation API and an execution API is executed (step A1).

In this case, the user program 21 notifies, when calling the execution API (Yes of step A2), the accelerator control unit 3 of a DAG created up to this point by the DAG creation unit 22, requests the accelerator control unit 3 to execute a process of the DAG, and completes the process (step A5).

On the other hand, in a case where an execution API is called (No of step A2), the DAG creation unit 22 confirms whether a reservation API is called or not (step A3).

In a case where the reservation API is called (Yes of step A3), the DAG creation unit 22 adds a process specified by the reservation API and output data to a DAG generated up to this point (step A4). A reference width necessary for the process specified by the reservation API is provided as an argument, and therefore the DAG creation unit 22 includes this information in the DAG. After step A4, or in a case of no reservation API call (No of step A3), the processing returns to step A1.

Figure 12:
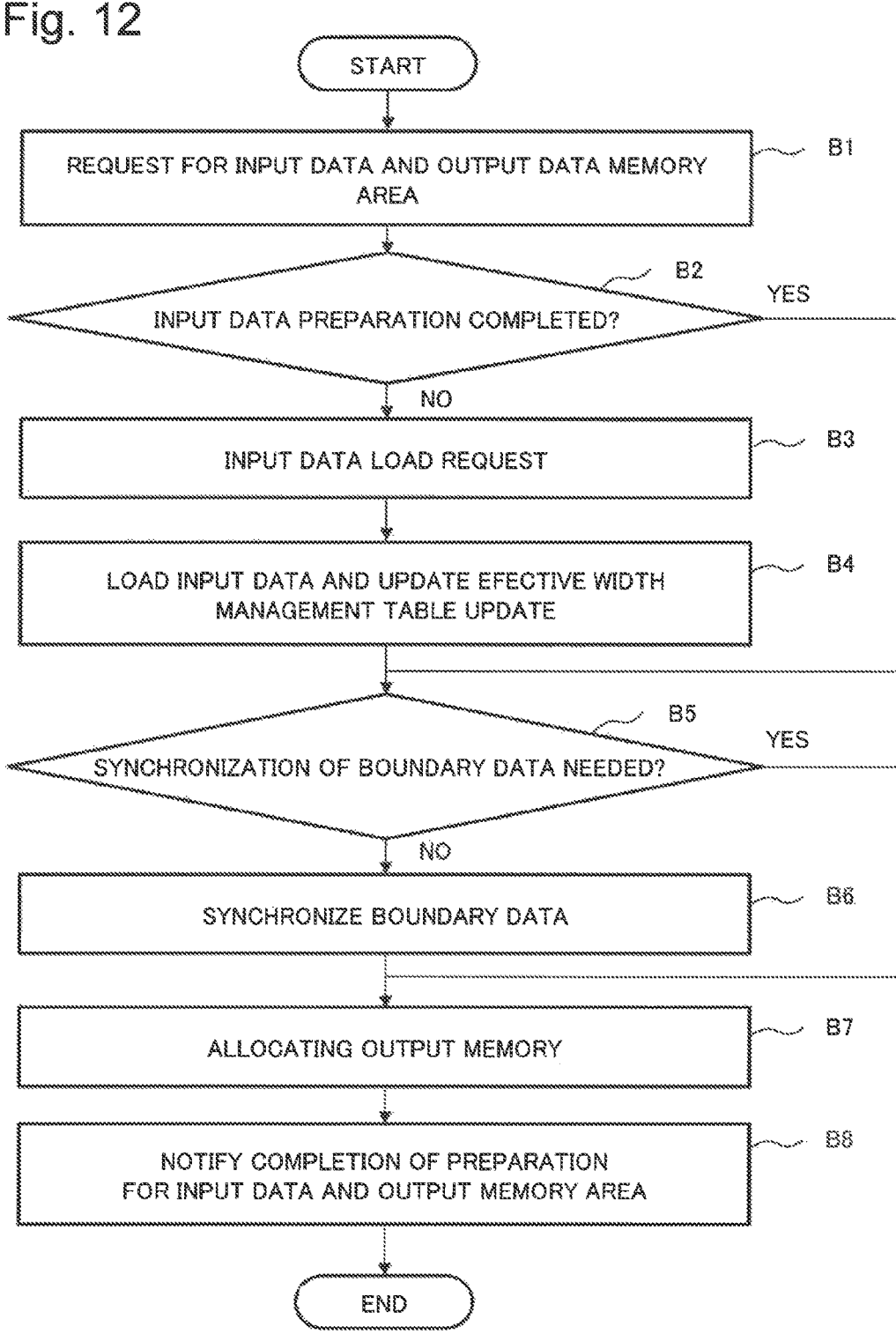
FIG. 12 is a flowchart exemplarily illustrating an operation of a data management unit by the accelerator control apparatus according to the first example embodiment of the present invention.

Next, using FIG. 2 and FIG. 12, an operation in which the data management unit 33 is requested from the task scheduler 321 to prepare input divided data necessary for executing a subtask and allocate a memory area of output divided data will be described.

The data scheduler 331 receives, from the task scheduler 321, a request for preparing input divided data necessary for executing a subtask and allocating a memory area of output divided data (step B1).

The data scheduler 331 refers to the data management table 35 and determines that the preparation of the data has been completed, when a calculation completion flag of the requested input divided data has been set (Yes of step B2).

On the other hand, when the preparation of the input data is not completed (No of step B2), the data scheduler 331 makes a load request for input data to the data transfer unit 332 (step B3). The data transfer unit 332 loads the requested divided data.

The data transfer unit 332 inquires of the boundary width read unit 334 about a boundary width of the divided data to be loaded and creates a boundary data item. The data transfer unit 332 registers information of a width of the created boundary data item and an effective width in an entry corresponding to the divided data in the effective width management table 34 (step B4). An accelerator that loads data in step B4 can be selected in a round-robin method or the like by considering load distribution among accelerators.

The data scheduler 331 inquires of the synchronization determination unit 333 and confirms whether it is necessary to perform synchronization for the input divided data (step B5). The synchronization determination unit 333 determines whether a reference width of a subtask executed for the input divided data is equal to or smaller than an effective width of the input divided data by referring to the effective width management table 34. When the reference width is larger than the effective width, the synchronization determination unit 333 determines that synchronization of a data division is needed (Yes of step B5).

The data scheduler 331 requests, when receiving the determination that the synchronization is needed, the data transfer unit 332 to synchronize boundary data of the divided data. The data transfer unit 332 synchronizes the boundary data item of the data division from a data division that stores segment data thereof and updates a value of the effective width in an entry corresponding to the divided data including the synchronized boundary data item in the effective width management table 34. In this case, synchronization is performed in such a way that the effective width and the boundary width are equal to each other (step B6).

The data scheduler 331 requests the data transfer unit 332 to allocate a memory area for output divided data in the same accelerator as the accelerator having allocated the input data. The data transfer unit 332 allocates the requested memory (step B7).

The data scheduler 331 notifies the task processing unit 32 of completion of the preparation of the input divided data and a memory area of the output divided data for executing a subtask (step B8). The data scheduler 331 notifies, as necessary, the task processing unit 32 of information relating to execution of the subtask such as the accelerator whose preparation is completed, or address information of the input/output data.

Figure 13:
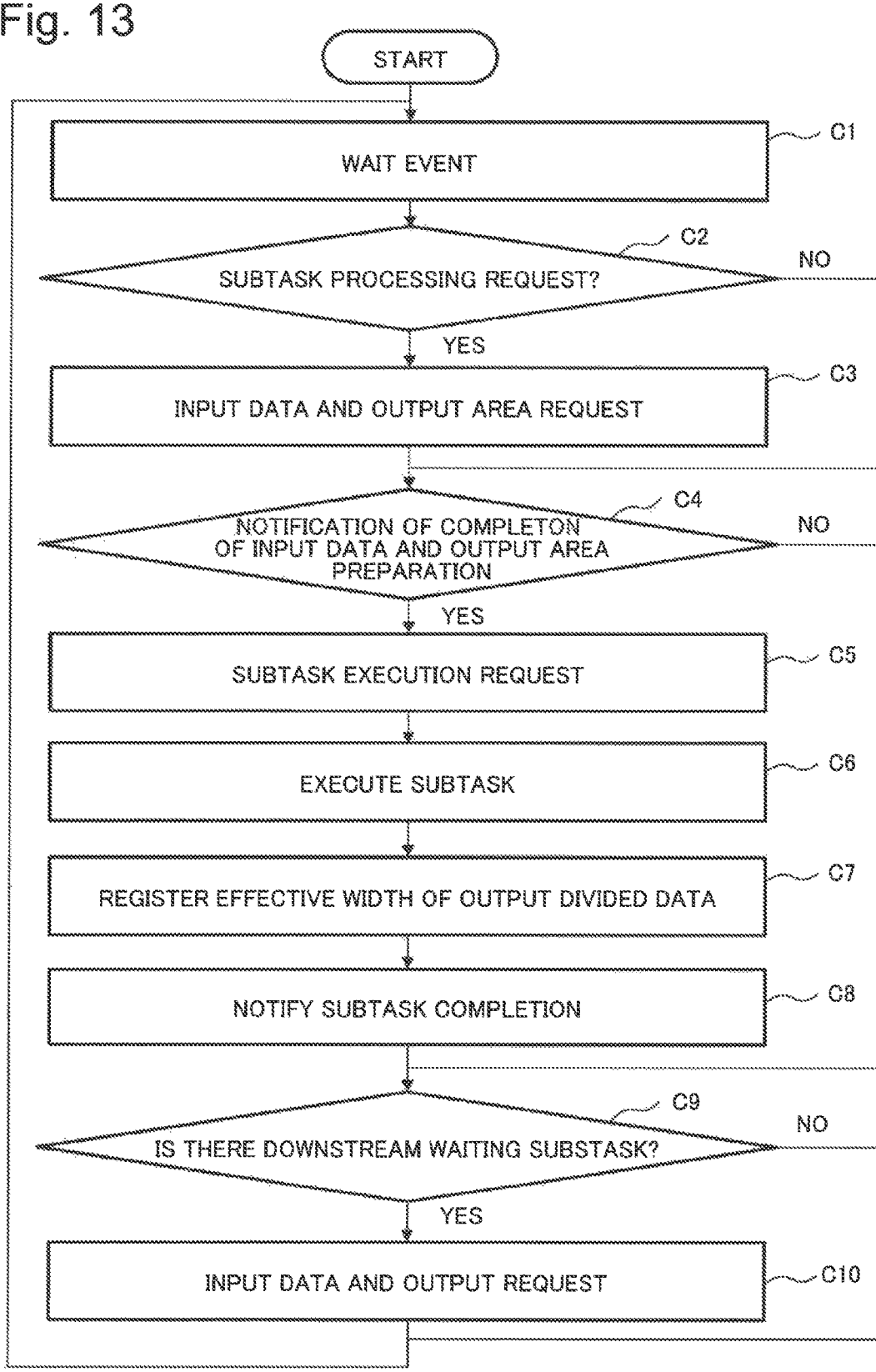
FIG. 13 is a flowchart exemplarily illustrating an operation of a task processing unit by the accelerator control apparatus according to the first example embodiment of the present invention.
Figure 14:
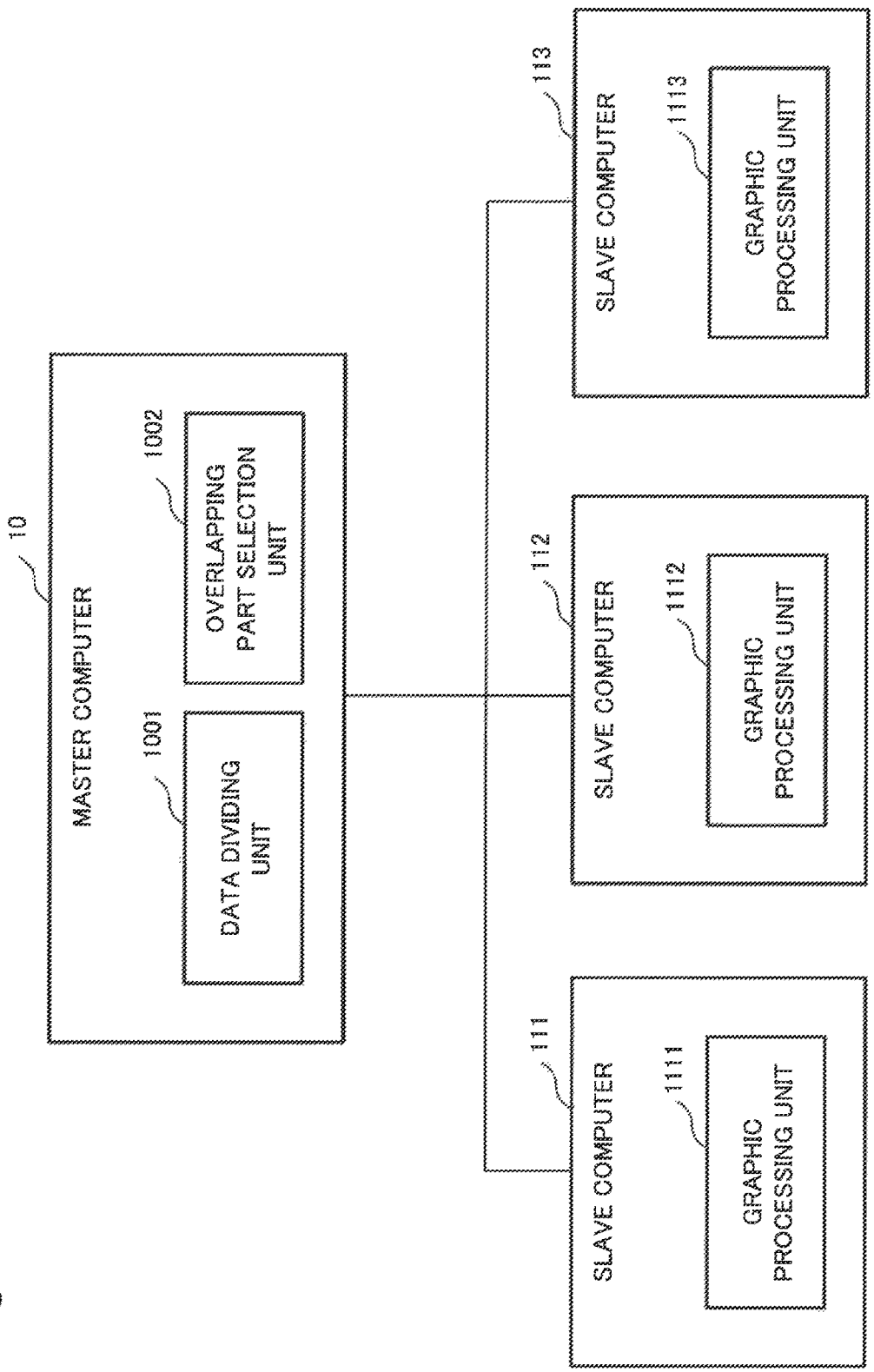
FIG. 14 is a block diagram illustrating a configuration of a multiprocessor system described in PTL 1.

Next, using FIG. 2 and FIG. 13, an operation of the task processing unit 32 will be described. FIG. 13 is a flowchart exemplarily illustrating an operation of the task processing unit 32.

The task scheduler 321 waits for occurrence of an event and executes, when an event occurs, processing therefor (step C1).

When the occurred event is a subtask execution request from the program analysis unit 31 (Yes of step C2), the task scheduler 321 requests the data management unit 33 for input divided data and a memory area of output divided data necessary for executing a subtask (step C3). In this case, the task scheduler 321 receives, from the program analysis unit 31, execution of all the subtasks of all the processes configuring a user DAG. The task scheduler 321 makes, with respect to the subtasks, only a request for a subtask of a most upstream process to the data management unit 33. With regard to a plurality of subtasks included in the upstream processe, a request for all the subtasks is made. Thereafter, with regard to a subtask of a downstream process, after all the subtasks of the upstream processes have been completed and preparation of input data for the downstream subtask has been completed, a request for all the subtasks is sequentially made with respect to each process (this corresponds to step C9 to be described later).

The task scheduler 321 requests the task execution unit 322 to execute a subtask (step C5), when an event occurred is a completion notification of preparation of input divided data and allocating of a memory area of output divided data for executing subtask from the data scheduler 331 (Yes of step C4).

The task execution unit 322 makes inquires to the processing range calculation unit 323 about a range to be processed in divided data and executes processing for a subtask with respect to the instructed range (step C6). The processing range instructed by the processing range calculation unit 323 is a range where a range obtained by combining segment data of the divided data and a range obtained by subtracting a reference width of a process executed by a subtask from an effective width of boundary data item stored by divided data.

The task execution unit 322 registers a value obtained by subtracting the reference width from an effective width of the input divided data into an entry corresponding to the output divided data in the effective width management table 34 (step C7), as an effective width, after executing the subtask.

The task scheduler 321 notifies the data management unit 33 of completion of the execution of the subtask (step C8).

The task scheduler 321 confirms whether there is still a subtask in which a request for preparing input divided data and allocating an output memory area has not been made to the data management unit 33 among subtasks requested to be executed by the program analysis unit 31, and further confirms whether all the subtasks included in processes upstream of a process to which the subtask belongs have been completed (step C9).

When there is a subtask that satisfies all the conditions (Yes of step C9), the task scheduler 321 requests the data management unit 33 to prepare input divided data of the subtask and allocate an output memory area (step C10).

In the present example embodiment configured as described above, in each piece of divided data, a range of adjacent divided data is redundantly stored as a boundary data item. In the present example embodiment, segment data and a boundary data item in which a width of data referred to in a process provided by a user program is subtracted are determined as a processing range and the determined processing range is processed. Further, in the boundary data item stored by the divided data, a width of data conforming to (being consistent with (having consistency with)) segment data is managed as an effective width. When the effective width is insufficient for a reference width of a process provided by the user program, the boundary data item is synchronized (copied from the segment data). Thereby, while divided data are stored on an accelerator, it is possible that any process provided from a user program is continuously executed in any order and an I/O cost for synchronization of a boundary data item between pieces of divided data necessary for processes is reduced. Therefore, according to the present example embodiment, when data are divided and processed by using a plurality of accelerators, any process can be continuously executed in any order at high speed.

Second Example Embodiment

Next, a second example embodiment of the present invention will be described. In the present example embodiment, a computer is caused to operate for each unit of the accelerator control apparatus 1 of the first example embodiment Specifically, a CPU (Central Processing Unit) and a memory mounted on a computer are controlled to execute the following operation. The CPU is controlled to execute functions of the user program 21, the DAG creation unit 22, the program analysis unit 31, the task scheduler 321, the task execution unit 322, the processing range calculation unit 323, the data scheduler 331, the data transfer unit 332, the synchronization determination unit 333, and the boundary width read unit 334. On the other hand, the memory of the computer is used to store the effective width management table 34, the data management table 35, the memory management table 36, and used as the main memory 4.

The memory is a storage means in a broad sense and includes a semiconductor memory, and an HDD (Hard Disk Drive) and a flash disk referred to generally as a secondary storage. Further, an accelerator may be formed to be inserted into an I/O slot of the computer. Using an I/O device interconnection, the accelerator and the computer can be connected.

The present invention is applicable, as one example, to accelerating of processing in a calculation apparatus including two or more accelerators. Further, the present invention is applicable, for example, to the above-described image processing (filter processing), as well as fluid analysis and structure analysis based on a difference method or a finite element method. Further, the present invention is applicable, in the same manner, for example, to analysis of dynamics based on Molecular Dynamics, optimization of a molecular structure based on Molecular Mechanics, and the like.

Following exemplary forms may be included in the scope of the present invention.

Exemplary Form 1

An accelerator control apparatus being configured to be similar to the accelerator control apparatus according to the first aspect.

Exemplary Form 2

The accelerator control apparatus according to Exemplary Form 1, wherein
when the data management unit determines that the width of the data being consistent is smaller than the reference width, the data management unit synchronizes the boundary data item and the segment data adjacent to the at least one segment data item before causing the accelerator to execute processing.

Exemplary Form 3

The accelerator control apparatus according to Exemplary Form 1 or 2, further including:
a table that stores, as an effective width, a width of data being included in the boundary data item and being consistent with the segment data item adjacent to the at least one segment data item; and
task processing unit for updating the effective width stored in the table with a value obtained by subtracting the reference width from the effective width stored in the table after the accelerator executes processing, wherein
the data management unit refers to the effective width stored in the table and performs determination.

Exemplary Form 4

The accelerator control apparatus according to Exemplary Form 3, wherein,
the task processing unit causes the accelerator to execute processing for the at least one segment data item and data of a particular width in the boundary data item, the particular width being obtained by subtracting the reference width from an effective width.

Exemplary Form 5

The accelerator control apparatus according to any one of Exemplary Form 1 to 4, further including:
DAG creation unit for providing an API (Application Program Interface) for creating a DAG (Directed Acyclic Graph) representing a process executed by a user program, wherein
the API accepts a kernel function indicating the process and the reference width as arguments.

Exemplary Form 6

An accelerator control apparatus being configured to be similar to the accelerator control apparatus according to the second aspect.

Exemplary Form 7

An accelerator control method being configured to be similar to the accelerator control method according to the third aspect.

Exemplary Form 8

The accelerator control method according to Exemplary Form 7, further including:
steps for, when determining that the width of the data being consistent is smaller than the reference width, synchronizing the boundary data item and the segment data item adjacent to the at least one segment data item before causing the accelerator to execute processing.

Exemplary Form 9

The accelerator control method according to Exemplary Form 7 or 8, further including:
steps for storing, as an effective width, a width of data being included in the boundary data item and being consistent with the segment data item adjacent to the at least one segment data item, in a table; and
steps for updating the effective width stored in the table with a value obtained by subtracting the reference width from the effective width stored in the table after the accelerator executes processing, wherein
the determining of the width of data is performed by referring to the effective width stored by the table.

Exemplary Form 10

The accelerator control method according to Exemplary Form 9 further comprising:
steps for causing the accelerator to execute processing for the at least one segment data item and data of a particular width in the boundary data item, the particular width being obtained by subtracting the reference width from an effective width.

Exemplary Form 11

The accelerator control apparatus according to any one of Exemplary Form 7 to 10, further including:
steps for providing an API (Application Program Interface) for creating a DAG (Directed Acyclic Graph) representing a process executed by a user program, wherein
the API accepts a kernel function indicating the process and the reference width as arguments.

Exemplary Form 12

A program being configured to be similar to the program according to the fourth aspect.

Exemplary Form 13

The program according to Exemplary Form 12, further causing the computer to execute:
processing of, when determining that the width of the data being consistent is smaller than the reference width, synchronizing the boundary data item and the segment data item adjacent to the at least one segment data item before causing the accelerator to execute processing.

Exemplary Form 14

The program according to Exemplary Form 12 or 13, further causing the computer to execute:

processing of storing, as an effective width, a width of data being included in the boundary data item and being consistent with the segment data item adjacent to the at least one segment data item, in a table;

processing of updating the effective width stored in the table with a value obtained by subtracting the reference width from the effective width stored in the table after the accelerator executes processing; and processing of the determining the width of data by referring to the effective width stored in the table.

Exemplary Form 15

The program according to Exemplary Form 14, further causing the computer to execute:

processing of causing the accelerator to execute processing for the at least one segment data item and data of a particular width in the boundary data item, the particular width being obtained by subtracting the reference width from an effective width.

Exemplary Form 16

The program according to any one of Exemplary Form 12 to 15, further causing the computer to execute:

processing for providing an API (Application Program Interface) for creating a DAG (Directed Acyclic Graph) representing a process executed by a user program, wherein the API accepts a kernel function indicating the process and the reference width as arguments.

It should be noted that the entire disclosed contents of the patent literature are incorporated and described in the present description by reference. The example embodiments can be further subjected to changes and adjustments, without departing from the scope of the entire disclosure (including the claims) of the present invention, further based on fundamental technical ideas. Further, various combinations among and a selection from various disclosed elements (including the elements of each claim, the elements of each example embodiment, and the elements of each drawing) are possible, without departing from the scope of the entire disclosure of the present invention. In other words, it goes without saying that the present invention includes various variations and modifications that could be made by those skilled in the art, based on the entire disclosure including the claims and technical ideas. Specifically, with regard to the numerical range described in the present description, it should be interpreted that any numerical value or small range included in the range is specifically described even unless otherwise described.

REFERENCE SIGNS LIST

1 Accelerator control apparatus
3 Accelerator control unit
4 Main memory
10 Master computer
21 User program
22 DAG creation unit
31 Program analysis unit
32 Task processing unit
33 Data management unit
34 Effective width management table
35 Data management table
36 Memory management table
51 to 53 Accelerator
61 to 66 Data
71 to 74 Process
81 3×3 Filter
82 5×5 Filter
92 Boundary data item
93 Boundary width
94 Effective width
111 to 113 Slave computer
321 Task scheduler
322 Task execution unit
323 Processing range calculation unit
331 Data scheduler
332 Data transfer unit
333 Synchronization determination unit
334 Boundary width read unit
511 to 513 Processor
521 to 523 Accelerator memory
911 to 913 Divided data
1001 Data dividing unit
1002 Overlapping part selection unit
1111 to 1113 Graphic processing unit
A Reference width

The invention claimed is:

1. An accelerator control apparatus comprising:
an accelerator that is configured to store at least one segment data item of a plurality of segment data items obtained by dividing data, and a boundary data item that is data item being included in a segment data item adjacent to the at least one segment data item; and
processing circuitry and a memory that stores instructions, when executed by the processing circuitry, causing the processing circuitry to form:
data management unit to determine whether a width of data which is included in the boundary data item and is consistent with the segment data item adjacent to the at least one segment data item, is equal to or larger than a reference width representing a width of data referred to in processing executed by the accelerator.

2. The accelerator control apparatus according to claim 1, wherein
when the data management unit determines that the width of the data being consistent is smaller than the reference width, the data management unit synchronizes the boundary data item and the segment data adjacent to the at least one segment data item before causing the accelerator to execute processing.

3. The accelerator control apparatus according to claim 1, further comprising:
a table, in the memory, that stores, as an effective width, a width of data being included in the boundary data item and being consistent with the segment data item adjacent to the at least one segment data item; and
wherein
the processing circuitry is further configured to form:
task processing unit to update the effective width stored in the table with a value obtained by subtracting the reference width from the effective width stored in the table after the accelerator executes processing, and
wherein
the data management unit refers to the effective width stored in the table and performs determination.

4. The accelerator control apparatus according to claim 3, wherein
the task processing unit causes the accelerator to execute processing for the at least one segment data item and data of a particular width in the boundary data item, the particular width being obtained by subtracting the reference width from an effective width.

5. The accelerator control apparatus according to claim 1, wherein the processing circuitry is further configured to form:
  DAG creation unit to provide an API (Application Program Interface) for creating a DAG (Directed Acyclic Graph) representing a process executed by a user program, and wherein
  the API accepts a kernel function indicating the process and the reference width as arguments.

6. An accelerator control method comprising:
  storing, on an accelerator, at least one segment data item of a plurality of segment data items obtained by dividing data and a boundary data item that is data included in segment data item adjacent to the at least one segment data item; and
  determining whether a width of data which is included in the boundary data item and is consistent with the segment data adjacent to the at least one segment data item, is equal to or larger than a reference width representing a width of data referred to in processing executed by the accelerator.

7. The accelerator control method according to claim 6, further comprising:
  when determining that the width of the data being consistent is smaller than the reference width, synchronizing the boundary data item and the segment data item adjacent to the at least one segment data item before causing the accelerator to execute processing.

8. The accelerator control method according to claim 6, further comprising:
  storing, as an effective width, a width of data being included in the boundary data item and being consistent with the segment data item adjacent to the at least one segment data item, in a table; and
  updating the effective width stored in the table with a value obtained by subtracting the reference width from the effective width stored in the table after the accelerator executes processing, wherein
  the determining of the width of data is performed by referring to the effective width stored in the table.

9. A non-transitory computer readable storage medium storing a program that causes a computer to execute:
  processing of causing an accelerator to store at least one segment data item of a plurality of segment data items obtained by dividing data and a boundary data item that is data being included in segment data adjacent to the at least one segment data item; and
  processing of determining whether a width of data which is included in the boundary data item and is consistent with the segment data adjacent to the at least one segment data item, is equal to or larger than a reference width representing a width of data referred to in processing executed by the accelerator.

* * * * *